United States Patent
Muthu et al.

(10) Patent No.: US 10,129,544 B2
(45) Date of Patent: Nov. 13, 2018

(54) SYSTEM AND METHOD FOR PERFORMING OPTIMAL TEMPORAL PREDICTIVE MODE DECISION IN H.264 VIDEO CODING

(71) Applicant: RIVERSILICA TECHNOLOGIES PVT LTD, Bangalore (IN)

(72) Inventors: Essaki P Muthu, Bangalore (IN); Jagadish K Kamath, Bangalore (IN); Sudhir Kesti, Bangalore (IN)

(73) Assignee: RIVERSILICA TECHNOLOGIES PVT LTD, Bangalore (IN)

( * ) Notice: Subject to any disclaimer, the term of this patent is extended or adjusted under 35 U.S.C. 154(b) by 0 days.

(21) Appl. No.: 14/908,511

(22) PCT Filed: Jul. 30, 2014

(86) PCT No.: PCT/IB2014/063548
§ 371 (c)(1),
(2) Date: Jan. 28, 2016

(87) PCT Pub. No.: WO2015/015436
PCT Pub. Date: Feb. 5, 2015

(65) Prior Publication Data
US 2016/0212421 A1 Jul. 21, 2016

(30) Foreign Application Priority Data
Jul. 30, 2013 (IN) .......................... 3408/CHE/2013

(51) Int. Cl.
*H04N 19/109* (2014.01)
*H04N 19/176* (2014.01)
(Continued)

(52) U.S. Cl.
CPC ........... *H04N 19/109* (2014.11); *H04N 19/15* (2014.11); *H04N 19/176* (2014.11);
(Continued)

(58) Field of Classification Search
CPC .. H04N 19/109; H04N 19/523; H04N 19/533; H04N 19/176; H04N 19/15; H04N 19/186
See application file for complete search history.

(56) References Cited

U.S. PATENT DOCUMENTS

2009/0116554 A1  5/2009 Ma et al.
2012/0134417 A1  5/2012 Layachi et al.
(Continued)

OTHER PUBLICATIONS

Sarwer, Mohammed G. "Efficient Motion Estimation and Mode Decision Algorithms for Advanced Video Coding." University of Windsor (2011) Electronic Theses and Dissertations. Paper 439.
(Continued)

*Primary Examiner* — Tung T Vo
*Assistant Examiner* — Joseph W Becker
(74) *Attorney, Agent, or Firm* — Maschoff Brennan

(57) ABSTRACT

The a method and system of making a coding mode decision for a given macroblock of a current frame is disclosed. A codec for making the coding mode decision is provided. The codec disclosed herein performs prediction of the motion vectors in inter-frames. The macroblock may be coded in one of six inter modes, such as skip mode, P16×16 mode, P16×8 mode, P8×16 mode, and P8×8 mode or in intra modes such as intra 4×4 mode and intra 16×16 mode. Each block in the inter-frame is predicted from a block of equal size in the reference frame. In each mode, the codec finds a best match, that is, a motion vector for each block size in the reference frame and calculates a corresponding cost. The codec evaluates each mode based on cost and the mode with the least cost is selected as best mode for coding the given macroblock.

16 Claims, 13 Drawing Sheets

(51) Int. Cl.
*H04N 19/15* (2014.01)
*H04N 19/186* (2014.01)
*H04N 19/533* (2014.01)
*H04N 19/523* (2014.01)

(52) U.S. Cl.
CPC ......... *H04N 19/186* (2014.11); *H04N 19/523* (2014.11); *H04N 19/533* (2014.11)

(56) References Cited

U.S. PATENT DOCUMENTS

2012/0219055 A1  8/2012  He et al.
2013/0129241 A1  5/2013  Wang et al.

OTHER PUBLICATIONS

MPEG-4 Part 10, Advanced Video Coding (MPEG-4 AVC), International Telecommunication Union, May 2003.

SYSTEM AND METHOD FOR PERFORMING OPTIMAL TEMPORAL PREDICTIVE MODE DECISION IN H.264 VIDEO CODING

FIELD OF INVENTION

The present invention, in general, relates to video encoding. More particularly, the present invention relates to a system and method of selecting a best coding mode for a macroblock in a current frame.

BACKGROUND OF THE INVENTION

In a video compression stream, an inter frame is a frame generally expressed in terms of one or more neighboring frames. The Inter frame prediction is a kind of prediction that tries to take advantage from temporal redundancy between neighboring frames allowing to achieve higher compression rates.

An inter coded frame is divided into blocks known as macroblocks. After that, instead of directly encoding the raw pixel values for each block, the encoder will try to find a block similar to the one it is encoding on a previously encoded frame, referred to as a reference frame. This process is done by a block matching algorithm. If the encoder succeeds on its search, the block could be encoded by a vector, known as motion vector, which points to the position of the matching block at the reference frame. The process of motion vector determination is called motion estimation.

In most cases the encoder will succeed, but the block found is likely not an exact match to the block it is encoding. The encoder will compute the differences between block found and the block it is encoding. The residual values are known as the prediction error and need to be transformed and sent to the decoder. If the encoder succeeds in finding a matching block on a reference frame, it will obtain a motion vector pointing to the matched block and a prediction error. Using both elements, the decoder will be able to recover the raw pixels of the block.

H.264, also referred to as Moving Picture Experts Group (MPEG)-4 Part 10 and Advanced Video Coding (AVC) is a video compression standard that is resilient to poor network conditions and more economical with its use of bandwidth, while providing good video quality. In this standard, a video stream is first split into single-image frames, and then sliced into 16×16 pixel macroblocks. The 16×16 macroblocks may be split further in different block sizes, for example, 8×8, 16×8, 4×4, etc. Predictions are then made on macroblocks for reducing the number of bits to represent the macroblocks. The H.264 standard defines multiple prediction modes for making coding mode decisions.

Conventional H.264 encoders evaluate all the prediction modes to find a best match and decide on the best prediction mode. Evaluating all prediction modes for determining the best prediction mode increases computational complexity.

A need therefore exists for a system and method for reducing computational complexity in determining the best prediction mode, thereby overcoming the drawbacks of the systems discussed above and also several other shortcomings inherent to the existing prior art.

BRIEF DESCRIPTION OF THE INVENTION

The above-mentioned shortcomings, disadvantages and problems are addressed herein which will be understood by reading and understanding the following specification.

It is, therefore, one aim of the disclosed embodiments to provide for a system and method of making a coding mode decision for a given macroblock of a current frame. A codec for making the coding mode decision is provided. The codec disclosed herein performs prediction of the motion vectors in inter-frames. In inter-frames, the macroblocks are coded using intra-modes and/or inter-modes. There are five types of inter frame modes, such as skip mode, P16×16 mode, P16×8 mode, P8×16 mode, and P8×8 mode. There are two types of intra frame modes such as INT4×4 mode and INT16×16 mode. Each block in the inter-frame is predicted from a block of equal size in the reference frame.

It is, therefore, one aim of the disclosed embodiments to provide for a method of making a coding mode decision for a given macroblock of a current frame in which the codec finds a best match, that is, a motion vector for each block size in the reference frame and calculates cost associated with the motion vector. The search for the motion vector involves performing integer level motion vector estimation. The integer level motion vector estimation is done in two steps. In the first step, a starting seed position for performing a hexagonal search is determined. In the second step, the codec first performs the hexagonal search starting from the determined seed position and then performs a diamond search. The result of the diamond search is the integer level motion vector.

It is, therefore, one aim of the disclosed embodiments to provide for a method of making a coding mode decision for a given macroblock of a current frame in which the codec determines position of a half pel motion vector from in and around the integer level motion vector. Further, the codec determines position of a qual pel motion vector from around the position of the half pel motion vector. The codec evaluates each mode based on cost and the mode with the least cost is selected as best mode for coding the given macroblock.

It is, therefore, one aim of the disclosed embodiments to provide for a system and method of making a coding mode decision for a given macroblock of a current frame in which the computational complexity is reduced by evaluating only one or more prediction modes instead of evaluating all the prediction modes for determining the best prediction mode.

Systems and methods of varying scope are described herein. In addition to the aspects and advantages described in this summary, further aspects and advantages will become apparent by reference to the drawings and with reference to the detailed description that follows.

DETAILED DESCRIPTION OF THE INVENTION

A method of making a coding mode decision for a given macroblock of a current frame is disclosed. The term "frame" refers to a single image in a sequence of images. The term "macroblock" refers to a group of pixels in a frame that may be treated as an entity during the processes of image compression and decompression. As used herein, the term "given macroblock" refers to the macroblock that is currently being encoded as per a motion estimation process. The current macroblock and the current frame is herein referred to as "macroblock" and "frame". The frame may be divided into multiple macroblocks for processing the frame at block level and the macroblocks may be further divided into blocks of different block sizes, for example, 16×16, 16×8, 8×16, 8×8, 8×4, 4×4, etc. Further, each macroblock comprises 16×16 luma samples and associated chroma samples. The method disclosed herein refers to processes implemented on the luma samples, unless otherwise mentioned.

The "motion estimation process" refers to a process of determining motion vectors that point to the best matching block in a reference frame. The motion vector therefore points to the position of the best matching block on the reference frame. As used herein, the term "best matching block" refers to a block in the reference frame that is similar to the macroblock currently being encoded. Also as used herein, the term "reference frame" refers to a previously encoded frame on which the best matching block is located.

A codec for making the coding mode decision is provided. The codec disclosed herein is configured to operate in conformance with the H.264/AVC video compression standard. It will be appreciated by those skilled in the art that the codec disclosed herein may be implemented on an application-specific computing device or a general purpose computing device comprising one or more processing elements and memory. The computing device may include, for example, an operating system for enabling the codec to carry out desired functions. The range of devices and platforms within which the codec may be implemented will be appreciated by those with ordinary skill in the art having regard to the following description.

Figure 1:
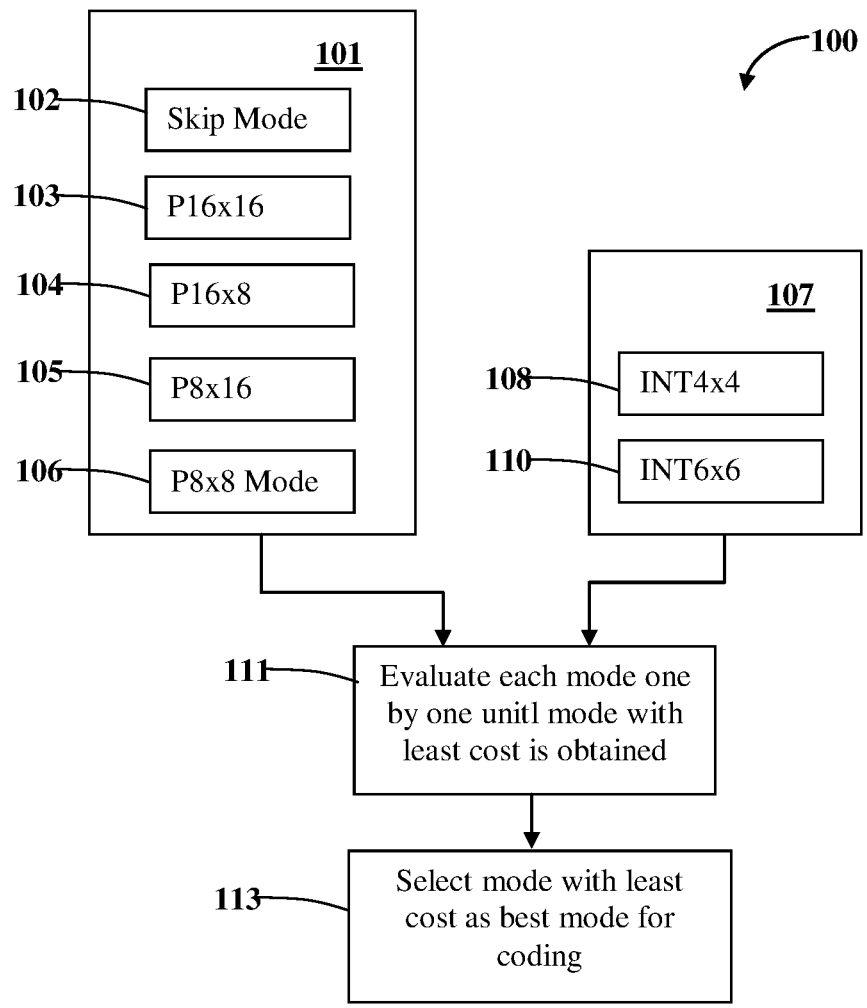
FIG. 1 exemplarily illustrates a simplified flow diagram showing steps for determining a best prediction mode for a given macroblock in a current frame.
Figure 2A:
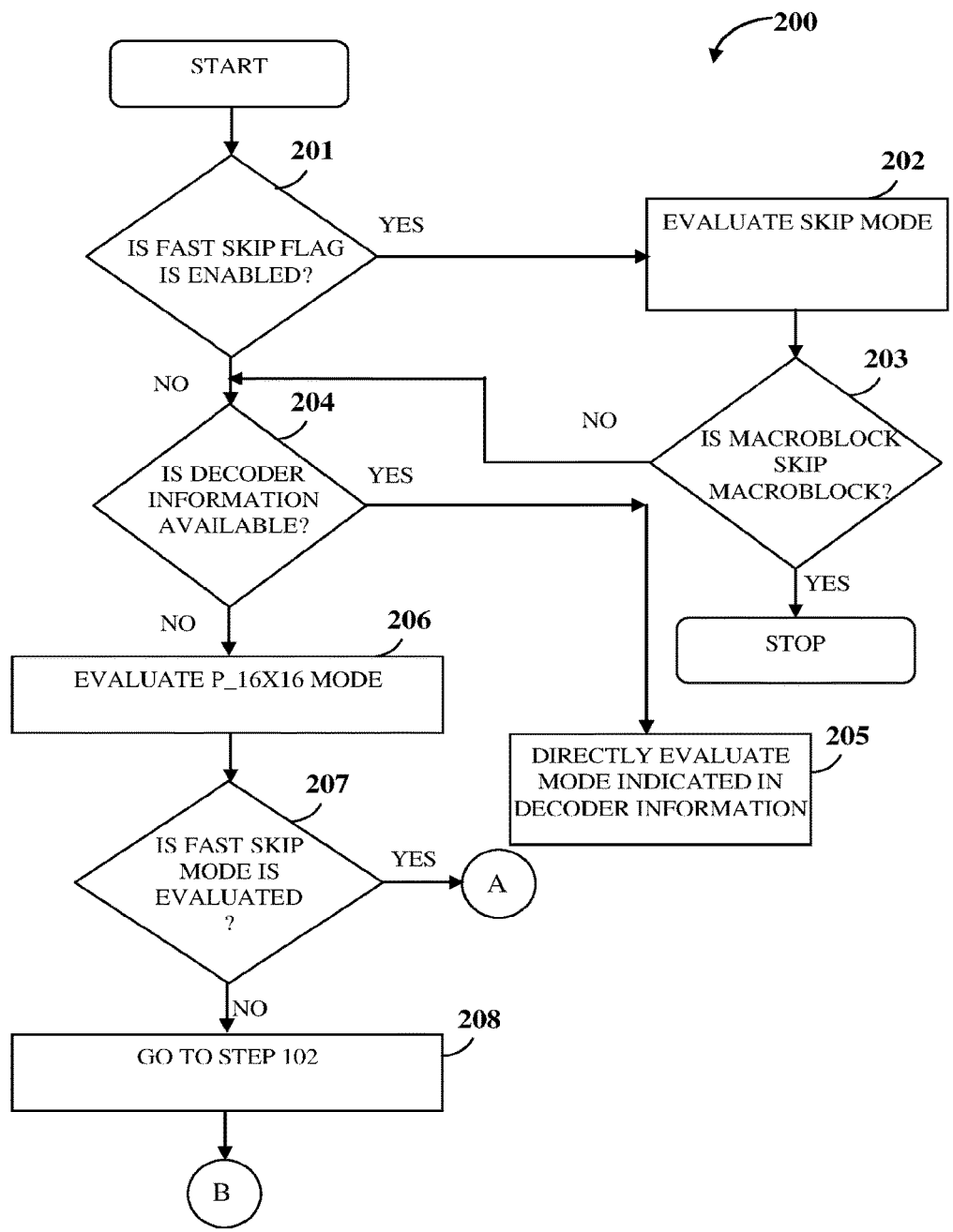
FIGS. 2A-2E exemplarily illustrates a detailed flow diagram showing steps for determining a best prediction mode for a given macroblock in a current frame.
Figure 2B:
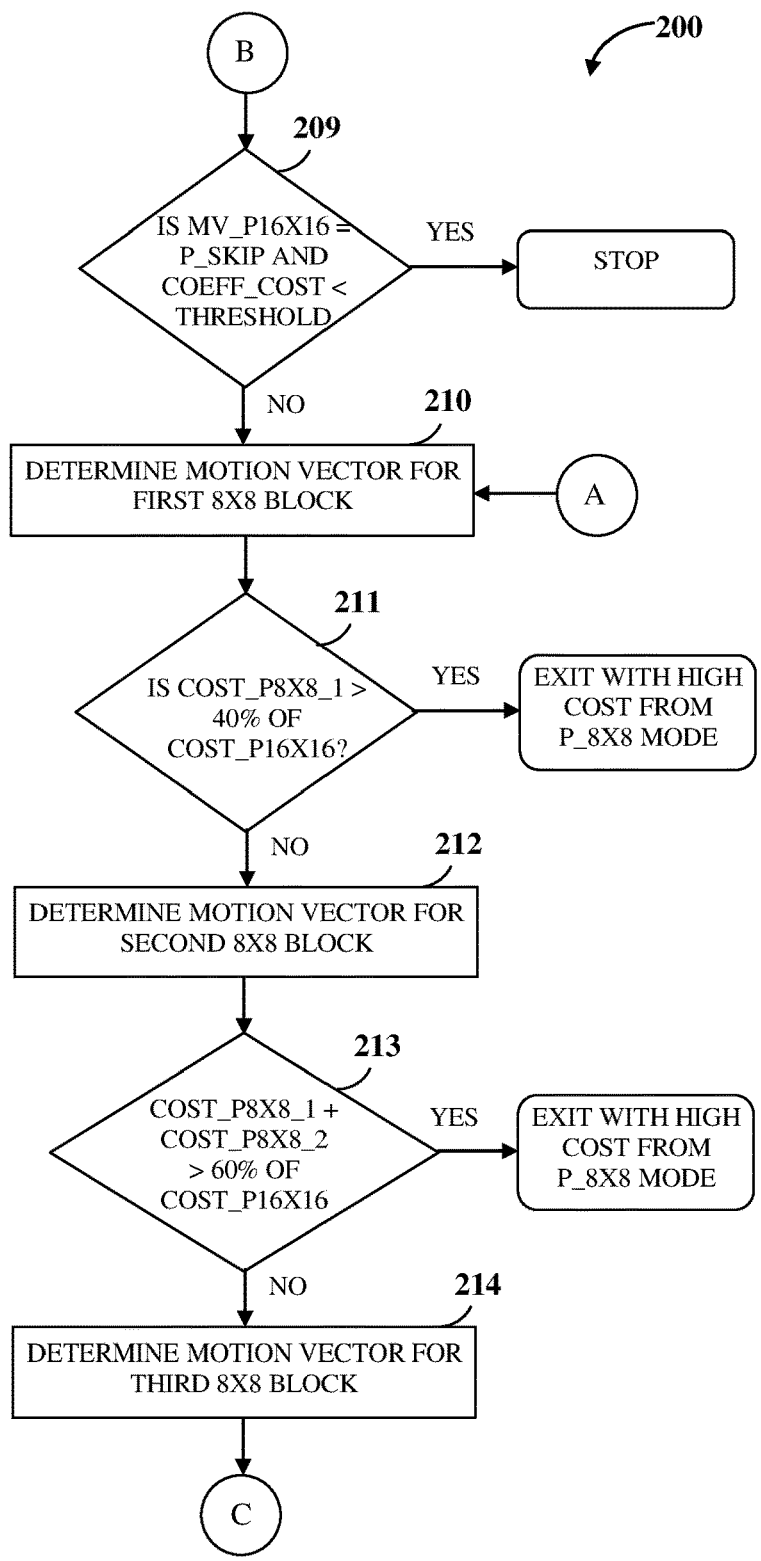
Figure 2C:
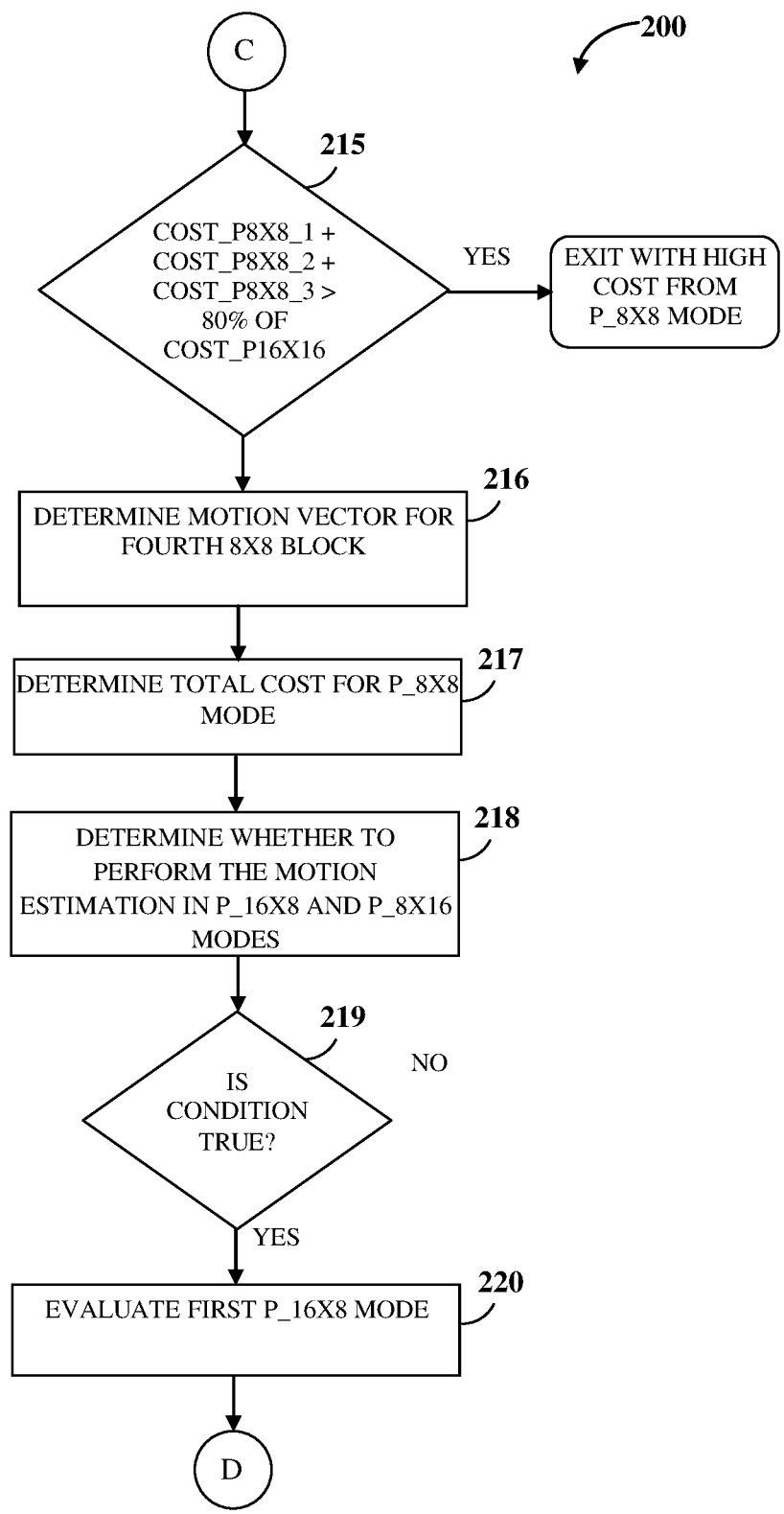
Figure 2D:
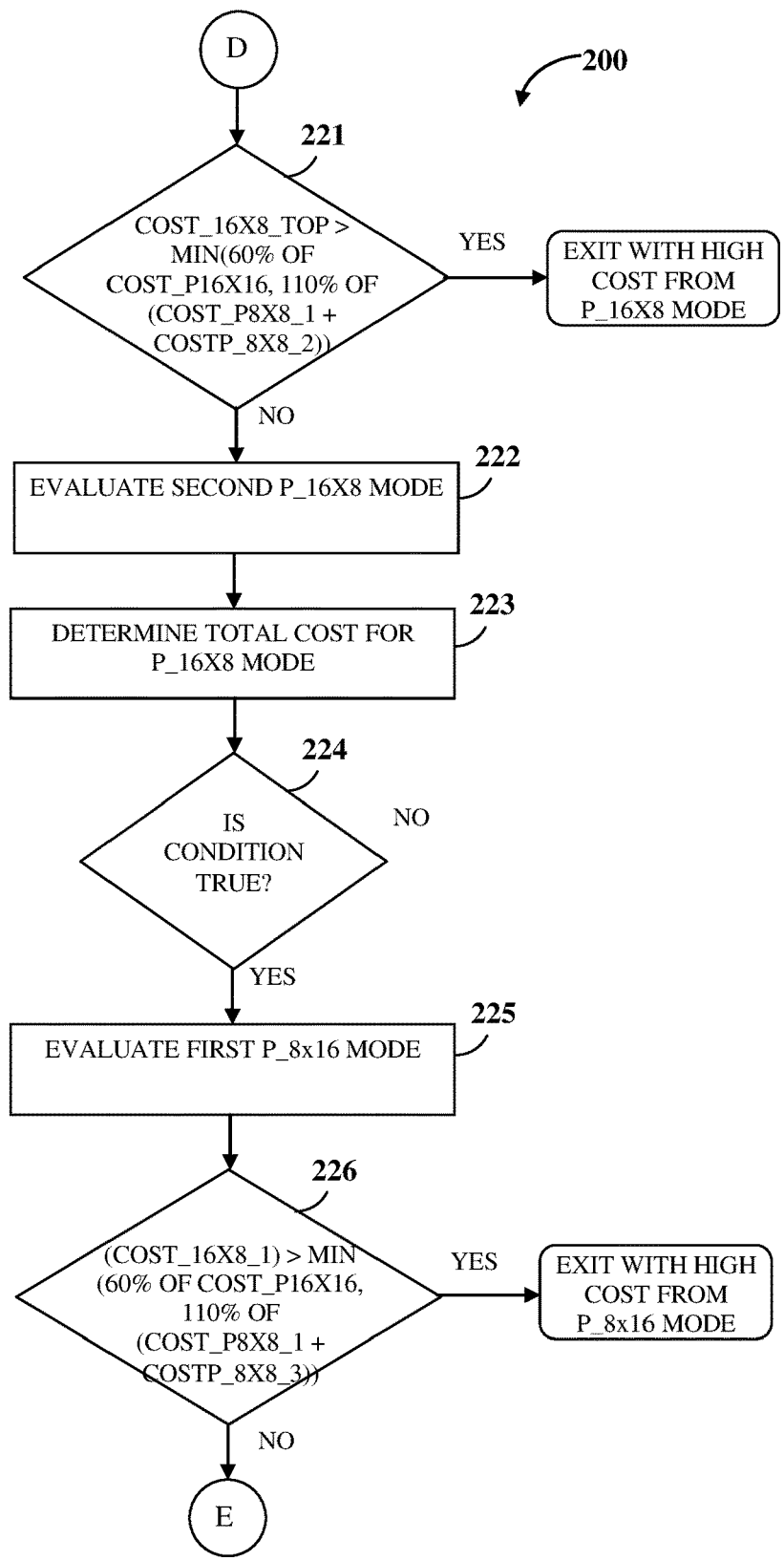
Figure 2E:
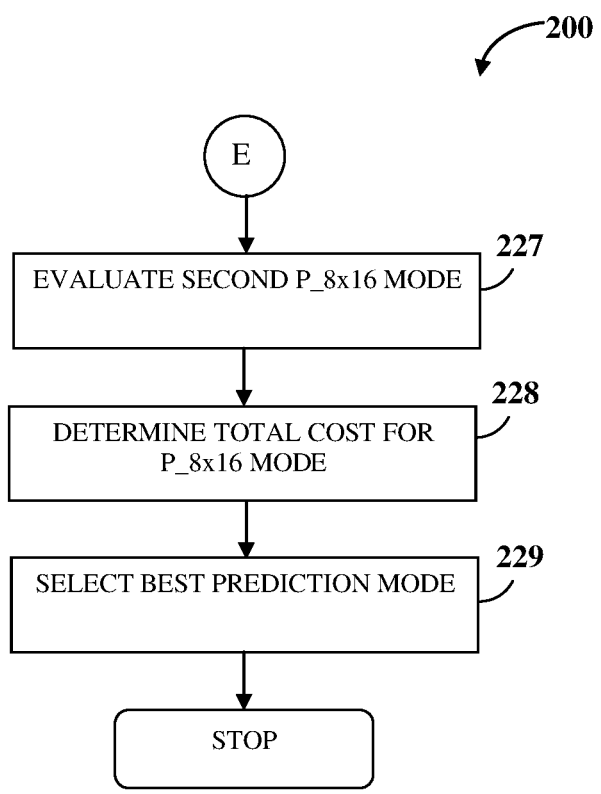

FIG. 1 exemplarily illustrates a simplified flow diagram showing method 100 for determining a best prediction mode for a given macroblock in a current frame. The codec disclosed herein, performs prediction of the motion vectors in inter-frames. In inter-frames, the macroblock is predicted based on temporal redundancy that exists between neighboring frames. In inter-frames, the macroblocks are coded using intra-modes 101 and/or inter-modes 107. There are five types of inter frame modes, such as skip mode 102, P16×16 mode 103, P16×8 mode block 104, P8×16 mode block 105, and P8×8 mode block 106. There are two types of intra frame modes 107 such as INT4×4 mode 108 and INT16×16 mode 110. Each block in the inter-frame is predicted from a block of equal size in the reference frame. As said at blocks 111 and 113, the codec evaluates each mode one by one based on cost and the mode with the least cost is selected as best mode.

FIGS. 2A-2E exemplarily illustrates a detailed flow diagram 200 showing steps for determining a best prediction mode for a given macroblock in the current frame. The codec checks, as said at block 201, the possibility of the macroblock being a skip macroblock based on status of a fast skip flag. That is, the codec finds the possibility of fast skip by looking at the neighborhood macroblocks. If the left, top, top-left and top-right macroblocks of the macroblock are skip macroblocks, then a fast skip flag is enabled.

If the fast skip flag is enabled, the codec evaluates skip mode, as said at block 202. The skip mode is evaluated only when the fast skip flag is enabled and when the macroblock is not in the first row or first column of the frame. As illustrated at block 203, the codec then checks, whether the macroblock is a skip macroblock, as disclosed in the detailed description of FIGS. 3A-3C. If the macroblock is a skip macroblock, the codec stops the motion estimation process.

If the macroblock is not a skip macroblock, the codec checks, as said at block 204, whether decoder information, for example, block size, motion vectors, etc., is available for the given macroblock. If the decoder information is available, the codec directly evaluates the mode indicated in the decoder information, as said at block 205. That is, the codec does not evaluate all the modes. If decoder information is available, only P_skip and the particular mode indicated in the decoder information is evaluated.

Figure 5:
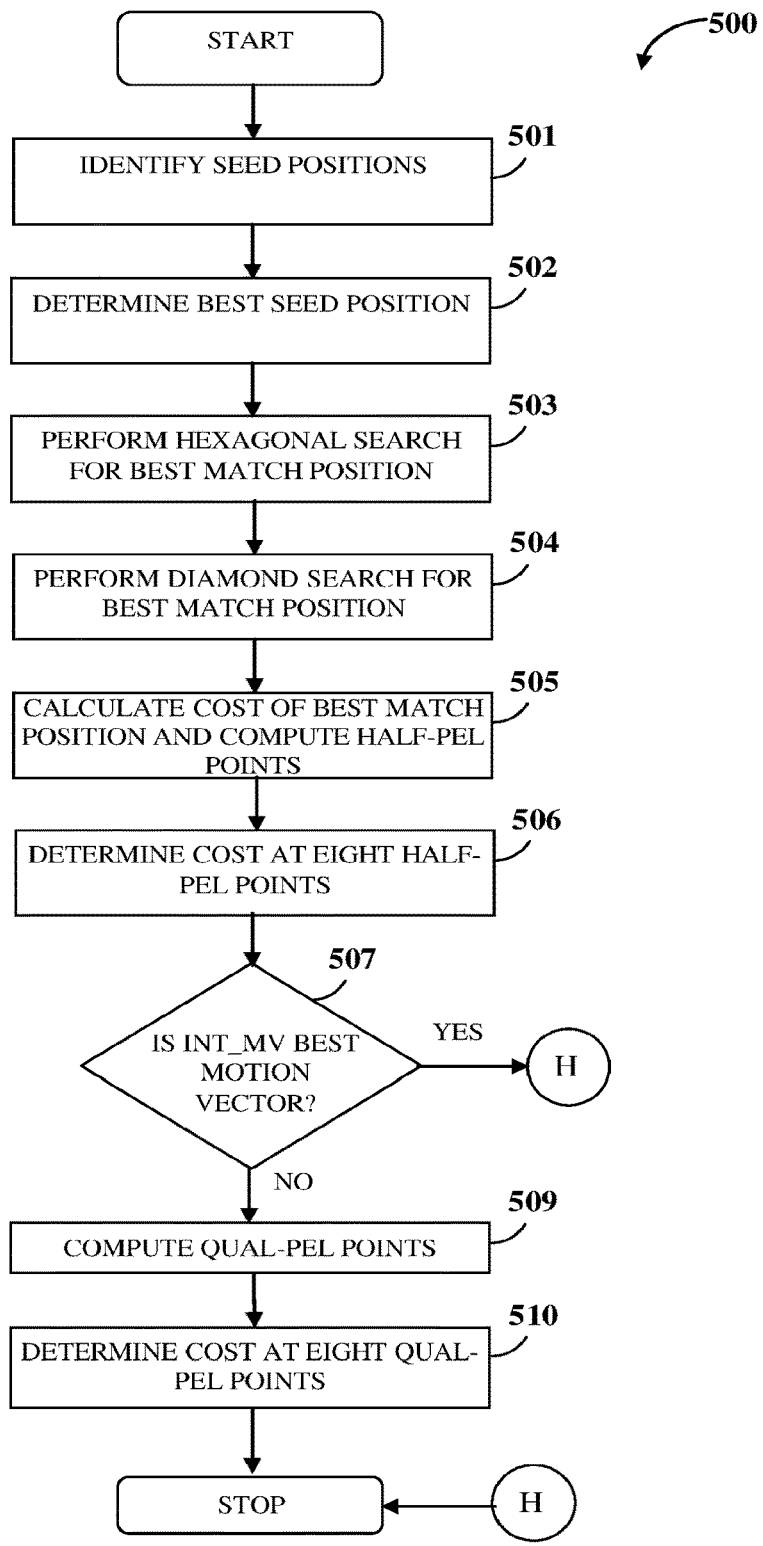
FIG. 5 exemplarily illustrates a flow diagram showing steps for determining a qual-pel motion vector for a given block.

As illustrated at block 206, if the decoder information is not available, the codec evaluates P_16×16 mode, as disclosed in the detailed description of FIG. 5. The P_16×16 mode is also evaluated when the decoder information indicates the block size as 16×16 and comprises its associated motion vector. The motion vector predicted under the P_16×16 mode is referred as "mvp_P16×16" and the associated cost is referred to as "cost_P16×16".

The codec then checks as said at block 207, whether the fast skip mode has been evaluated. If the fast skip mode was evaluated, the codec evaluates P_8×8 mode, as said at block 210. As said at block 208, if the fast skip mode has not been evaluated, the codec performs block 202, that is, the codec evaluates the P_Skip mode, as disclosed in the detailed description of FIG. 3. The codec determines the predicted motion vector (mvp_P Skip) under P_Skip mode.

The codec checks as said at block 209, whether best motion vector (mv_P16×16) is equal to P_SKIP and if coeff_cost is less than a threshold, then P_SKIP is finalized. The codec disables estimation of motion vectors under all other block sizes in all other modes.

If the P_Skip mode is not finalized, then codec evaluates each of the four P_8×8 modes. The P_8×8 modes are also evaluated when the decoder information indicates the block size as 8×8 and comprises its associated motion vectors. The codec performs motion vector estimation for determining motion vector for the first 8×8 block and calculates the associated cost (cost_P8×8_1), as said at block 210.

The codec checks the following, as said at block 211:

$$\text{cost\_}P8\times8\_1 > 40\% \text{ of cost } P16\times16 \qquad \text{—Condition (1)}$$

If the Condition (1) is true, then the codec exits with high cost from the P_8×8 mode. If the Condition (1) is false, then the codec determines motion vector for the second 8×8 block (P8×8_2) and calculates associated cost (cost_P8×8_2), as said at block 212.

As illustrated at block 213, the codec checks the following:

$$\text{sum of (cost\_}P8\times8\_1 \text{ and cost\_}P8\times8\_2) > 60\% \text{ of cost\_}P16\times16 \qquad \text{—Condition (2)}$$

If Condition (2) is true, then the codec exits with high cost from the P_8×8 mode. If Condition (2) is false, the codec determines the motion vector for the third 8×8 block (P8×8_3) and calculates associated cost (cost_P8×8_3) as said at block 214

As illustrated at block 215, the codec checks the following:

$$\text{sum of } (cost\_P8\times8\_1, cost\_P8\times8\_2 \text{ and } cost\_P8\times8\_3) > 80\% \text{ of } cost\_P16\times16 \quad \text{—Condition (3)}$$

If Condition (3) is true, then the codec exits with high cost from the P_8×8 mode. If Condition (3) is false, then the codec determines the motion vector for the fourth 8×8 block (P8×8_4) and calculates associated cost (cost_P8×8_4), as said at block 216.

As depicted at block 217, the codec then determines the total cost for the P_8×8 mode as follows:

$$cost\_P8\times8 = \text{sum of } cost\_P8\times8\_1, cost\_P8\times8\_2, cost\_P8\times8\_3 \text{ and } cost\_P8\times8\_4 \quad \text{Equation (1)}$$

The codec then determines, as said at block 218, whether or not to perform the motion estimation in P_16×8. The codec evaluates a threshold based on cost, herein referred to as "costoff" as follows:

$$costoff = \frac{51 \times 15 + QP}{51 \times 16} \quad \text{Equation (2)}$$

where QP refers to quantization parameter. The codec evaluates a threshold based on motion vector, herein referred to as "mvoff" as follows:

$$mvoff = \left\lfloor \frac{QP}{3} \right\rfloor \quad \text{Equation (3)}$$

The codec checks as depicted at block 219, for the following condition to determine whether or not to perform P_16×8 motion estimation:

If $\lfloor costoff X \text{ cost of top half } P\_16\times16 \rfloor > \lfloor (cost\_P8\times8\_1 + cost\_P8\times8\_2) \rfloor$ and if $|mvx\_P8\times8\_1 - mvx\_P8\times8\_2| \leq mvoff$ and if $|mvy\_P8\times8\_1 - mvy\_P8\times8\_2| \leq mvoff$ and if $\lfloor costoff X \text{ cost of bottom half } P\_16\times16 \rfloor > \lfloor (cost\_P8\times8\_3 + cost\_P8\times8\_4) \rfloor$ if $|mvx\_P8\times8\_3 - mvx\_P8\times8\_4| \leq mvoff$ and if $|mvy\_P8\times8\_3 - mvy\_P8\times8\_4| \leq mvoff$,  —Condition (4)

where, mvx_P8×8_1 and mvx_P8×8_2 refers to "x" components of the motion vectors evaluated under the P8×8_1 mode and the P8×8_2 mode respectively;

mvy_P8×8_1 and mvy_P8×8_2 refers to "y" components of the motion vectors evaluated under the P8×8_1 mode and the P8×8_2 mode respectively;

mvx_P8×8_3 and mvx_P8×8_4 refers to "x" components of the motion vectors evaluated under the P8×8_3 mode and the P8×8_4 mode respectively; and mvy_P8×8_3 and mvy_P8×8_4 refers to "y" components of the motion vectors evaluated under the P8×8_3 mode and the P8×8_4 mode respectively.

If the Condition (4) is true, then the codec evaluates as said at block 220, the first or top P_16×8 mode (P_16×8_1). That is, the codec determines the motion vector and the associated cost (cost_16×8_1) in the first P_16×8 mode. The P_16×8 mode is also evaluated when the decoder information indicates the block size as 16×8 and comprises its associated motion vector. The codec checks 221 the following:

$$cost\_16\times8\_1 > \min(60\% \text{ of } cost\_P16\times16, 110\% \text{ of } (cost\_P8\times8\_1 + costP\_8\times8\_2)) \quad \text{—Condition (5)}$$

If Condition (5) is true, then the codec exits with high cost from the P_16×8 mode. If Condition (5) is false, then the codec evaluates as said at block 222, a second or bottom P_16×8 mode (P16×8_2). That is, the codec determines the motion vector and the associated cost (cost_16×8_2) in the second P_16×8 mode. The codec determines as depicted at block 223, total cost of P_16×8 mode as follows:

$$cost\_P16\times8 = \text{sum of } cost\_P16\times8\_1 \text{ and } cost\_P16\times8\_2 \quad \text{—Equation (4)}$$

As said at block 224, the codec checks the following condition to determine whether or not to evaluate P_8×16 motion mode:

If $\lfloor costoff X \text{ cost of left half } P\_16\times16 \rfloor > \lfloor (cost\_P8\times8\_1 + cost\_P8\times8\_3) \rfloor$ and if $|mvx\_P8\times8\_1 - mvx\_P8\times8\_3| \leq mvoff$ and if $|mvy\_P8\times8\_1 - mvy\_P8\times8\_3| \leq mvoff$ and if $\lfloor costoff X \text{ cost of rite half } P\_16\times16 \rfloor > \lfloor (cost\_P8\times8\_2 + cost\_P8\times8\_4) \rfloor$ if $|mvx\_P8\times8\_2 - mvx\_P8\times8\_4| \leq mvoff$ and if $|mvy\_P8\times8\_2 - mvy\_P8\times8\_4| \leq mvoff$  —Condition (6)

If condition (6) is true, then the codec evaluates as said at block 225, a first or left P_8×16 mode (P_8×16_1). That is, the codec determines the motion vector and the associated cost (cost_8×16_1) in the first P_16×8 mode. The P_8×16 mode is also evaluated when the decoder information indicates the block size as 8×16 and comprises its associated motion vector.

As depicted at block 226, the codec then checks the following:

$$cost (cost\_16\times8\_1) > \min(60\% \text{ of } cost\_P16\times16, 110\% \text{ of } (cost\_P8\times8\_1 + costP\_8\times8\ 3)). \quad \text{—Condition (7)}$$

If Condition (7) is true, then the codec exits with high cost from the P_8×16 mode. If Condition (7) is false, then the codec evaluates, as illustrated at block 227 the second or right P_8×16 mode. That is, the codec determines the motion vector and the associated cost (cost_8×16 2) in the second P_16×8 mode.

As depicted at block 228, the codec determines total cost of P_8×16 mode as follows:

$$cost\_P16\times8 = \text{sum of } cost\_P8\times16\_1 \text{ and } cost\_P8\times16\_2 \quad \text{—Equation (5)}$$

The codec selects a best prediction mode among the evaluated modes, as said at block 229. The best prediction mode refers to the mode with minimum cost. The codec thereby makes the coding mode decision for encoding the macroblock that results in an optimized rate with less distortion. The term "rate" refers to the amount of data required to encode an image or video.

Figure 3A:
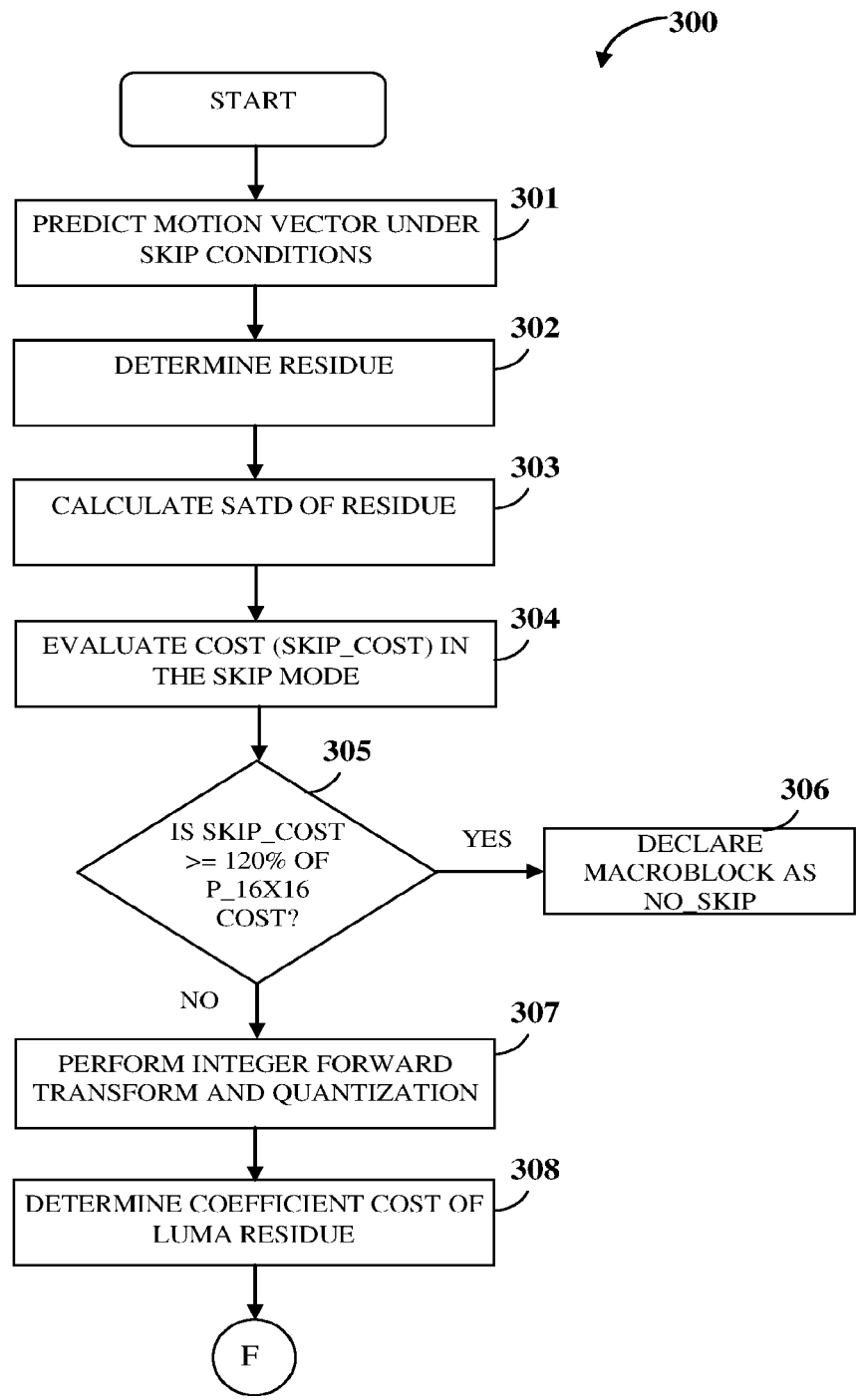
FIGS. 3A-3C exemplarily illustrates a method for evaluating skip mode.
Figure 3B:
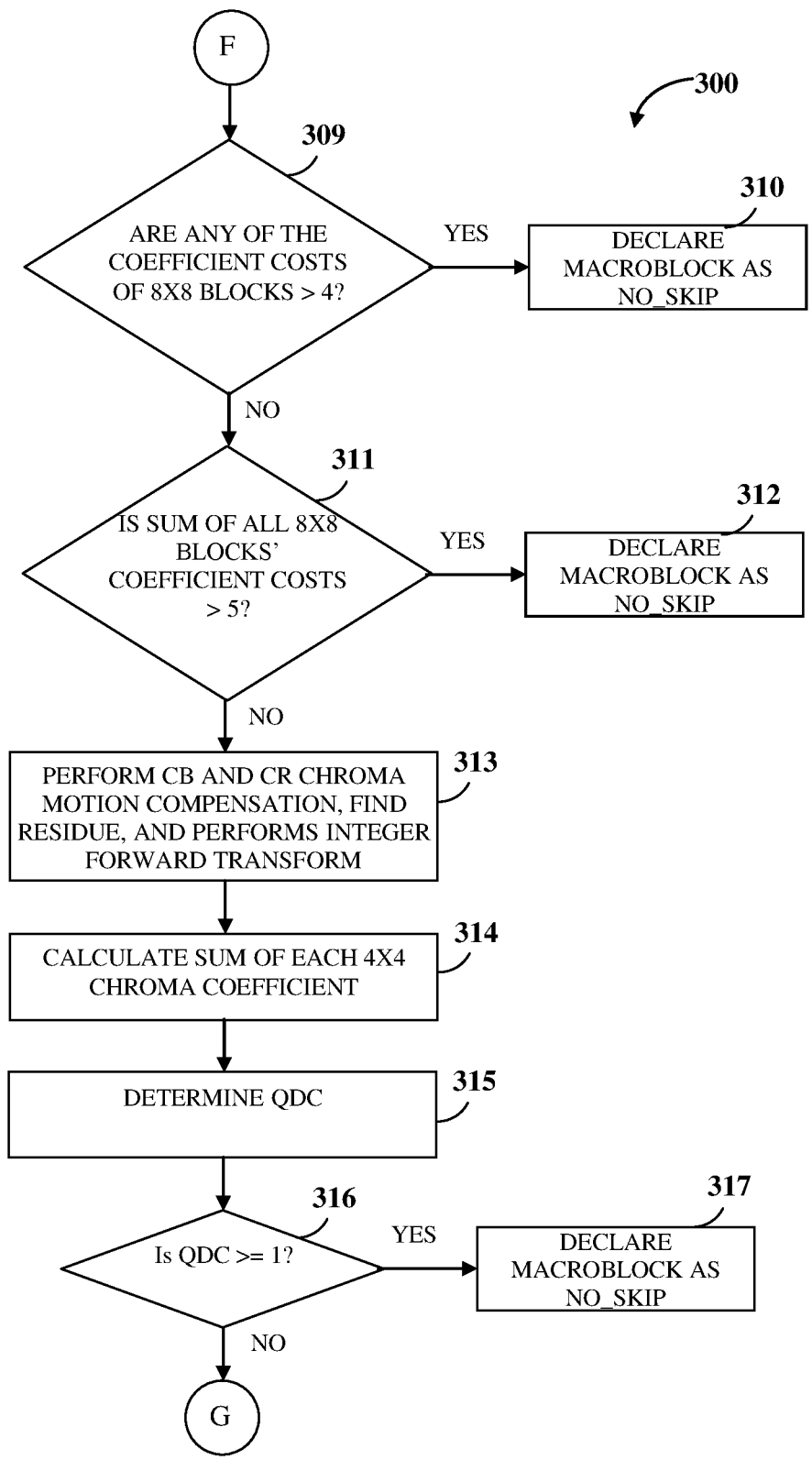
Figure 3C:
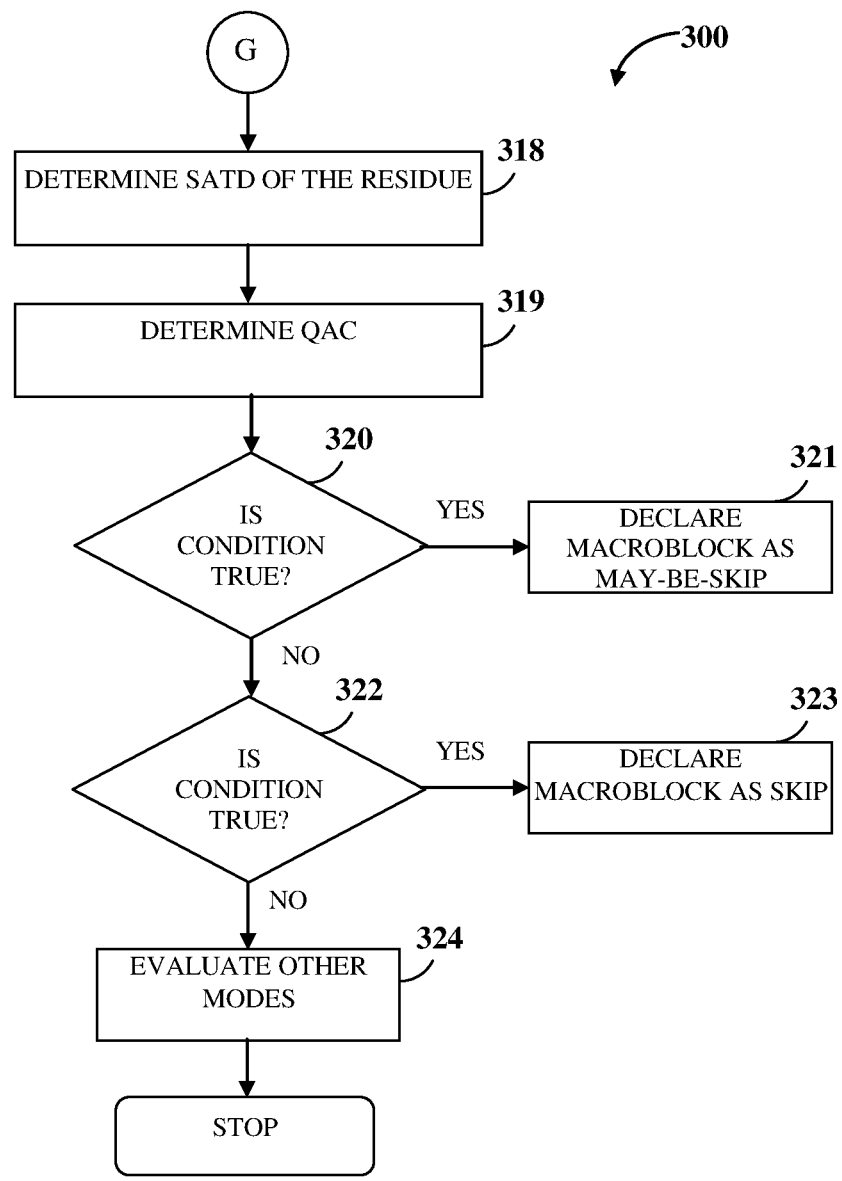

FIGS. 3A-3C exemplarily illustrates a flow diagram 300 showing steps for evaluating the skip mode. As said at block 301, the codec predicts a motion vector under based on the motion vectors of neighbourhood macroblocks. The codec performs luma motion compensation with skip motion vectors and determines a residue, as said at block 302. The term "residue" refers to the difference between the original block and motion compensated block, that is, the predicted block. The codec then calculates a sum of absolute transformed differences (SATD) of the residue, as said at block 303.

As illustrated at block 304, the codec evaluates cost (skip_cost) in the skip mode as follows:

$$\text{skip\_cost} = \text{SATD} + \text{lambda}(QP) \qquad \text{—Equation (6)}$$

where QP refers to the quantization parameter.

As said at block 305, codec then checks the following:

$$\text{skip\_cost} >= 120\% \text{ of cost\_}P16 \times 16 \qquad \text{—Condition (8)}$$

If the Condition (8) is true, the codec declares as depicted at block 306 the macroblock as no_skip. If the Condition (8) is false, then the codec performs the steps of integer forward transform and quantization on the residue as said at block 307. The result of block 307 is a set of transformed and quantized coefficients.

Figure 4:
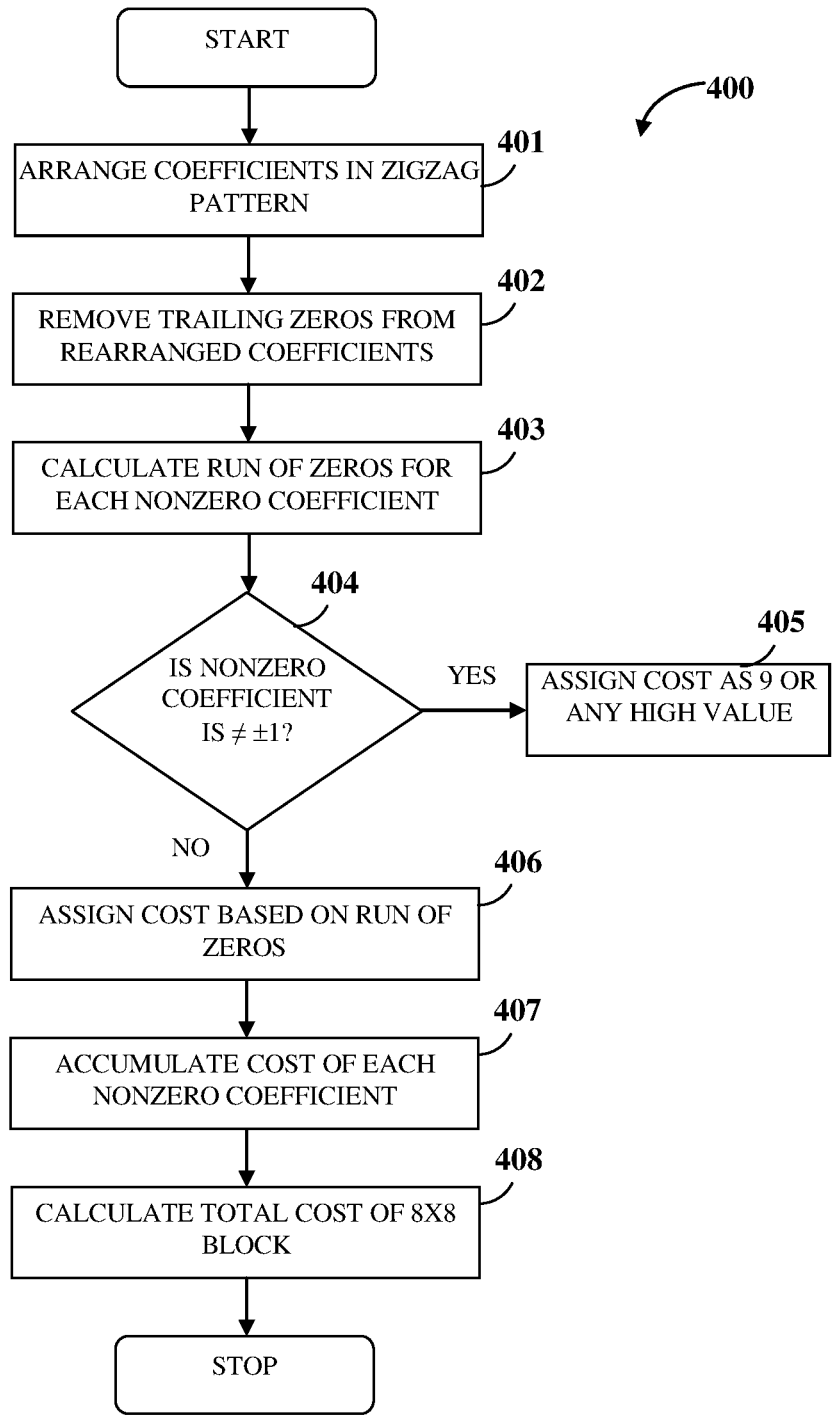
FIG. 4 exemplarily illustrates a method for determining a coefficient cost of luma residue.

The codec then determines as said at block 308, a coefficient cost of luma residue, as disclosed in the detailed description of FIG. 4. The codec checks whether any of the coefficient costs of the 8×8 blocks is greater than a pre-defined luma 8×8 coefficient cost threshold, as illustrated at block 309. The pre-defined luma 8×8 coefficient cost threshold is 4. If any of the coefficient costs of the 8×8 blocks is greater than four, then the codec declares the macroblock as no_skip, as said at block 310.

If any of the coefficient costs of the 8×8 blocks is lesser than four, then the codec checks whether the sum of all 8×8 blocks' coefficient costs is greater than a pre-defined luma 16×16 coefficient cost threshold as said at block 311. The pre-defined luma 16×16 coefficient cost threshold is 5. If the sum of all 8×8 blocks' coefficient costs is greater than 5, then the codec declares as said at block 312, the macroblock as no_skip.

If the sum of all 8×8 blocks' coefficient costs is lesser than 5, the codec performs Cb chroma motion compensation, finds residue, and performs integer forward transform, as depicted at block 313. As illustrated at block 314, the codec then calculates sum of each 4×4 chroma coefficients (DC), which are called DC1, DC2, DC3 and DC4, as follows:

$$DC = DC1 + DC2 + DC3 + DC4 \qquad \text{—Equation (7)}$$

As said at block 315, the codec determines quantized DC component (QDC) as follows:

$$QDC = (DC + 2 \times FF) \times (MF >> 1) >> 16 \qquad \text{—Equation (8)}$$

where FF refers to an offset value derived from an offset table based on QP and MF refers to multiplication factor derived from an MF table based on QP.

As said at block 316, the codec checks whether $$QDC >= 1 \qquad \text{—Condition (9)}$$

If Condition (9) is true, then the codec declares as said at block 317, the macroblock as no_skip. If Condition (9) is false, the codec determines SATD of the residue, as said at block 318.

As depicted at block 319, the codec determines the quantized AC component (QAC) as follows:

$$QAC = 2 \times SATD - [ABS(DC1) + ABS(DC2) + ABS(DC3) + ABS(DC4)] \qquad \text{—Equation (9)}$$

The codec checks as said at block 320, whether $$QAC > \text{ac\_threshold} \qquad \text{—Condition (10)}$$

If Condition (10) is true and there are no neighborhood skip macroblocks and cost_P16×16>PSKIP cost and (cost threshold <5), then the codec declares as said at block 321, the macroblocks as may_be_skip.

Where ac_threshold=QSTEP/2
QSTEP is calculated or derived from lookup table by QP.
The term cost threshold is given by:

$$\text{cost threshold} = (\text{cost\_}P16 \times 16 - P\text{SKIP cost}) / (\text{cost\_}P16 \times 16) \times 100 \qquad \text{—Equation (10)}$$

The blocks 313-321 are then repeated for the Cr component.

The codec checks as illustrated at block 322, whether there are no neighbourhood skip macroblocks and checks the following:

$$\text{cost\_}P16 \times 16 > P\text{SKIP cost and if cost threshold} < 10)) \text{ or may\_be\_skip} \qquad \text{—Condition (11)}$$

If ((there are no neighbourhood skip macroblocks) and Condition (11) is true, then the codec declares as said at block 323, the macroblock as skip macroblock. If the Condition (11) is not true, then the macroblock is not a skip macroblock and the codec evaluates other modes as depicted at block 324.

FIG. 4 exemplarily illustrates a flow diagram 400 showing a method for determining a coefficient cost of luma residue. The term "coefficient cost of luma residue" refers to the cost of the coefficients obtained after transformation and quantization of the residue. In this method, the codec calculates cost of 4×4 blocks of an 8×8 block. The codec arranges the coefficients of a 4×4 block in a zigzag pattern, as illustrated at block 401. In the case of luma, all 16 coefficients are considered for rearranging. As said at block 402, the codec removes trailing zeros from the rearranged coefficients. The codec then calculates a run of zeros for each nonzero coefficient from the last nonzero coefficient, as said at block 403. The codec checks as said at block 404, whether the nonzero coefficient is not equal to ±1. If the nonzero coefficient is not equal to ±1, then the cost is assigned as 9 or any high value, as said at block 405. If the nonzero coefficient is equal to ±1, then the cost is assigned, as said at block 406, based on the run of zeros for the nonzero coefficient. The codec accumulates the cost of each nonzero coefficient, as said at block 407. The blocks 401 to 407 are then repeated for each of the 4×4 blocks. The codec calculates the total cost of 8×8 block as the sum of costs of four 4×4 blocks, as said at block 408.

FIG. 5 exemplarily illustrates a flow diagram 500 showing steps for determining a qual-pel motion vector for a given block. As said at block 501, the codec identifies seed positions, which serve as starting points for searching the integer level motion vector. As used herein, the term "seed positions" refer to positions of the pixels in the reference frame that are probable motion vectors for the block. The seed positions may vary based on the type of mode.

The seed positions for the P16×16 mode are: motion vector at (0,0), 16 co-location motion vectors, 4 top motion vectors, 1 top-left motion vector, 1 top-right motion vector, 4 left motion vectors, 4 right motion vectors, 1 bottom-left motion vector, 4 bottom motion vectors, 1 bottom-right motion vectors, 1 predicted motion vector (mvp_P16×16), and 1 motion vector predicted under p_skip mode (mvp_PSKIP).

The seed positions for the first P_8×8 mode are: motion vector at (0, 0), 4 co-location motion vectors, 2 top motion vectors, 1 top-left motion vector, 1 top-right motion vector, 2 left motion vectors, 2 right motion vectors, 1 bottom-left motion vector, 2 bottom motion vectors, 1 bottom-right motion vector, 1 mv_P16×16 motion vector, 1 top-left motion vector predicted under P8×8 mode (mvp_P8×8).

The seed positions for the second P_8×8 mode are: motion vector at (0,0), 4 co-location motion vectors, 2 top motion vectors, 1 top-left motion vector, 1 top-right motion vector, 2 left motion vectors, 2 right motion vectors, 1 bottom-left motion vector, 2 bottom motion vectors, 1 bottom-right motion vector, 1 mv_P16×16 motion vector, 1 top-right mvp_P8×8.

The seed positions for the third P_8×8 mode are: motion vector at (0,0), 4 co-location motion vectors, 2 top motion vectors, 1 top-left motion vector, 1 top-right motion vector, 2 left motion vectors, 2 right motion vectors, 1 bottom-left motion vector, 2 bottom motion vectors, 1 bottom-right motion vector, 1 mv_P16×16 motion vector, 1 bottom-left mvp_P8×8.

The seed positions for the fourth P_8×8 mode are: motion vector at (0,0), 4 co-location motion vectors, 2 top motion vectors, 1 top-left motion vector, 1 top-right motion vector, 2 left motion vectors, 2 right motion vectors, 1 bottom-left motion vector, 2 bottom motion vectors, 1 bottom-right motion vector, 1 mv_P16×16 motion vector, 1 bottom-right mvp_P8×8.

The seed positions for the first 16×8 macroblock are: motion vector at (0,0), 8 co-location motion vectors, 4 top motion vectors, 1 top-left motion vector, 1 top-right motion vector, 2 left motion vectors, 2 right motion vectors, 1 bottom-left motion vector, 4 bottom motion vectors, 1 bottom-right motion vector, 1 mv_P16×16 motion vector, 2 top mv_P8×8 motion vectors.

The seed positions for the second 16×8 block are: motion vector at (0,0), 8 co-location motion vectors, 4 top motion vectors, 1 top-left motion vector, 1 top-right motion vector, 2 left motion vectors, 2 right motion vectors, 1 bottom-left motion vector, 4 bottom motion vectors, 1 bottom-right motion vector, 1 mv_P16×16 motion vector, 2 bottom my P8×8 motion vectors.

The seed positions for the first 8×16 block are: motion vector at (0,0), 8 co-location motion vectors, 2 top motion vectors, 1 top-left motion vector, 1 top-right motion vector, 4 left motion vectors, 4 right motion vectors, 1 bottom-left motion vector, 2 bottom motion vectors, 1 bottom-right motion vector, 1 mv_P16×16 motion vector, 2 left my P8×8 motion vectors.

The seed positions for the second 8×16 block are: motion vector at (0,0), 8 co-location motion vectors, 2 top motion vectors, 1 top-left motion vector, 1 top-right motion vector, 4 left motion vectors, 4 right motion vectors, 1 bottom-left motion vector, 2 bottom motion vectors, 1 bottom-right motion vector, 1 mv_P16×16 motion vector, 2 right mv_P8×8 motion vectors.

The codec determines a best seed position among the seed positions in each of the modes, as said at block 502. In this step, the codec first finds unique motion vectors from the given seed positions. The codec then right shifts the motion vectors by two and rounds, that is, ((mv+2)>>2). The codec calculates the residue as follows: residue=original−predicted, and calculates sum of absolute differences (SAD).

The codec then calculates cost as follows:

$$COST=SAD+(\lambda_1(QP) \times mvd\_rate)>>16 \quad \text{—Equation (11)}$$

where
mvd=mv−mvp_Pwxh
mvd_rate=mvd_bits(abs(mvdx))+mvd_bits(abs(mvdy)).
"mvp_Pwxh" refers to predicted motion vector for a given block size.

The codec determines cost in and around (0,0) for a 3×3 search area. Further, the codec determines cost in and around mvp_Pwxh for a 3×3 search area. The codec selects the best seed position (mv0) as the seed position that yields the least cost (cost0).

As said at block 503, the codec then performs a hexagonal search for determining position of a best match, as disclosed in the detailed description of FIG. 5. The term "best match" refers to macroblock in the reference frame that is most similar to a given macroblock in the current frame. The best seed position serves as centre of the hexagonal search. That is, the hexagonal search is initiated with the best seed position serving as the starting point of the hexagonal search. As said at block 504, the codec then performs a diamond search for determining the position of the best match. The determined start point (0, 0) from the hexagonal search is the centre for performing the diamond search.

In an embodiment, the codec performs the hexagonal search and the diamond search for second best cost, but with respect to best seed position. In another embodiment, the codec performs the hexagonal search and the diamond search with respect to second best seed position.

At the end of the diamond search, the best integer level motion vector is determined. The codec calculates cost associated with the best integer level motion vector (COST0) as follows:

$$COST0=SATD+(\lambda_1(QP) \times mvd\_rate)>>16$$
$$(mvd\_rate=mvd\_bits(abs(mvdx))+mvd\_bits(abs(mvdy))) \quad \text{—Equation (12)}$$

The codec determines a half pel motion vector for computing fractional pixel accuracies, as depicted at block 505. The codec computes the eight half-pel points around the best integer level motion vector by using a 6-tap interpolation filter. The half-pel points are located between the best integer level motion vector. As said at block 506, the codec determines cost at the 8 half-pel points in a 3×3 search area defined around the integer level motion vector (int_mv). As said at block 507 whether the best motion vector is equal to int_mv and if the cost at each of the eight half-pel points is greater than 125% of COST0. If the best motion vector is int_mv, the codec exits the process and does not perform qual-pel motion vector estimation, as said at block 508. The half-pel point with the least cost is also referred to as "half-pel motion vector" (half_mv) and the corresponding cost as "half_cost".

If the best motion vector is not int_mv, the codec considers the half-pel point with the least cost as the best motion vector and goes on to perform qual-pel motion estimation. The codec computes the eight qual-pel points around the best half-pel level motion vector by using a 2-tap interpolation filter, as said at block 509. As illustrated at block 510, the codec determines cost at the 8 qual-pel points in a 3×3 search area defined around the half-pel motion vector (half_mv). The qual-pel point with the least cost is also referred to as "qual-pel motion vector" (qual_mv) and the corresponding cost as best cost (qual_cost).

Figure 6:
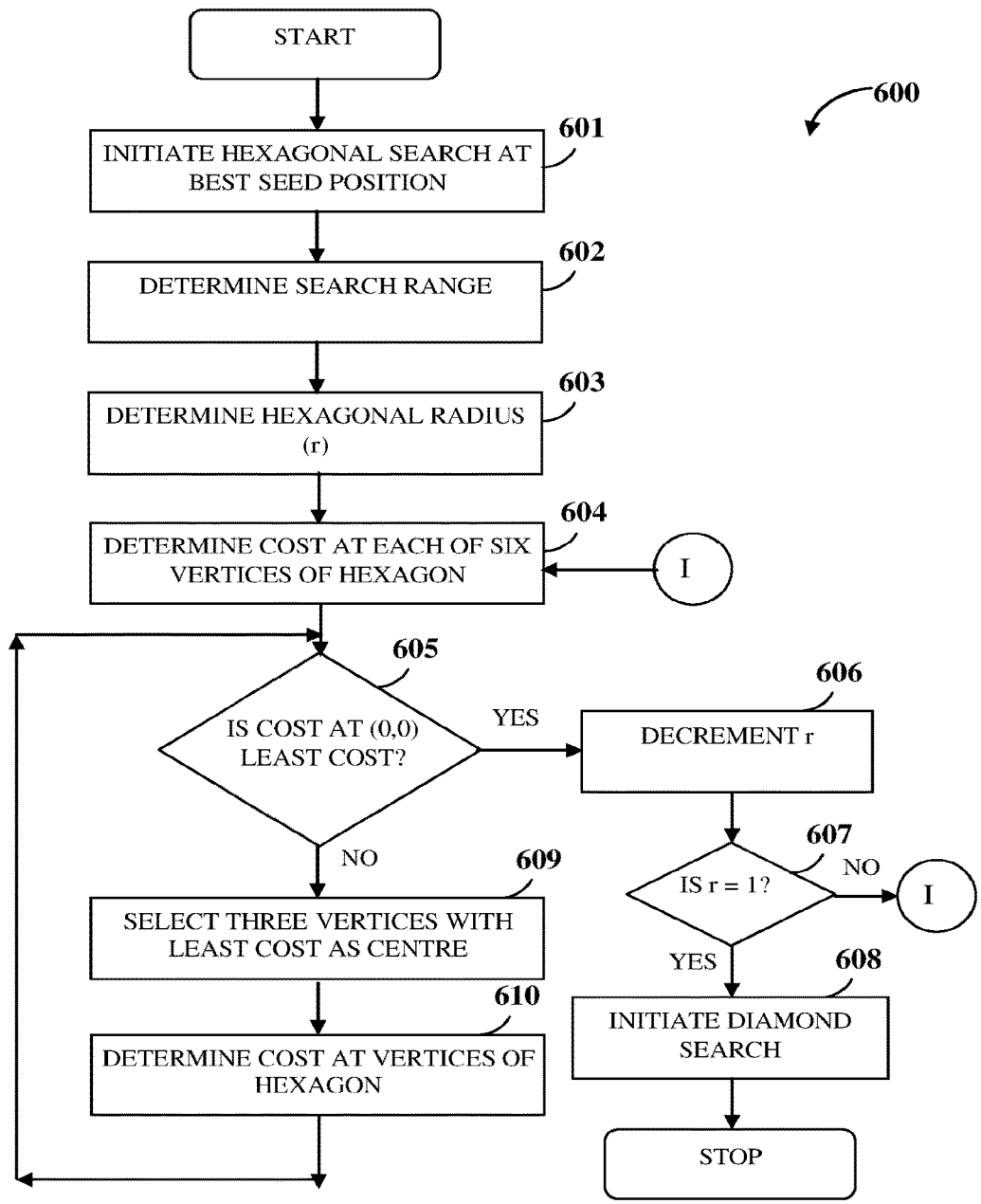
FIG. 6 exemplarily illustrates a method for performing a hexagonal search.

FIG. 6 exemplarily illustrates a flow diagram 600 showing a method for performing a hexagonal search. The codec initiates the hexagonal search with the best seed position serving as centre of the hexagonal search, as said at block 601. That is, the hexagonal search is initiated with the best seed position serving as the starting point of the hexagonal search. Further, as illustrated at block 602, the codec determines a search range for performing the hexagonal search. The codec varies the search range based on resolution and neighbourhood information. The search range may be varied based on resolution as per the following equation:

$$\text{search range}=\text{square root}(width \times height/400) \quad \text{—Equation (13)}$$

Further, the search range may be varied based on the neighbourhood information as per the following condition:

the search range is increased by 2 if the number of unique seed positions are more than 50% of total number of seed positions and 50% of those motion vectors (absolute) are more than 4× search range. The codec checks for this condition for every macroblock.

As illustrated at block 603, the codec determines a hexagonal radius 'r' for the hexagonal search as follows: sqrt (search range). In an embodiment, the codec enables a user to specify the search range. In this embodiment, the codec overrides the above condition and sets the hexagonal radius, r=2. The codec sets the search area as follows:

$$\text{Search area} = [(2 \times \text{search range}) + 1] \times [(2 \times \text{search range}) + 1] \qquad \text{—Equation (14)}$$

As illustrated at block 604, the codec determines cost at each of the six vertices of the hexagon drawn around the best seed position (0, 0) as centre and with radius=r. The codec then checks whether the cost at seed position (0,0) is the least cost among all the seven costs or if the reference exceeds the search area, as said at block 605. If the cost at the best seed position (0, 0) is the least cost among all the seven costs or if the reference exceeds the search area, then the codec decrements "r" by one, as illustrated at block 606. The codec checks whether r=1 and if r=1, the codec initiates the diamond search, as said at blocks 607 and 608.

If the cost at the best seed position (0,0) is not the least cost among the seven costs, then as said at block 609, the codec selects the seed position, that is, a vertex of the hexagon with the least cost as the centre for the next hexagonal search. As said at block 610, the codec again determines cost at each vertex of the hexagon that has its centre at the seed position with the least cost from the previous hexagonal search and with radius "r". However, from the second iteration onwards, the codec only calculates determines cost at three of the vertices of the hexagon, as the costs at the remaining vertices are available from the previous hexagonal search. The codec repeats the blocks 605 to 610, until the radius=1.

Figure 7:
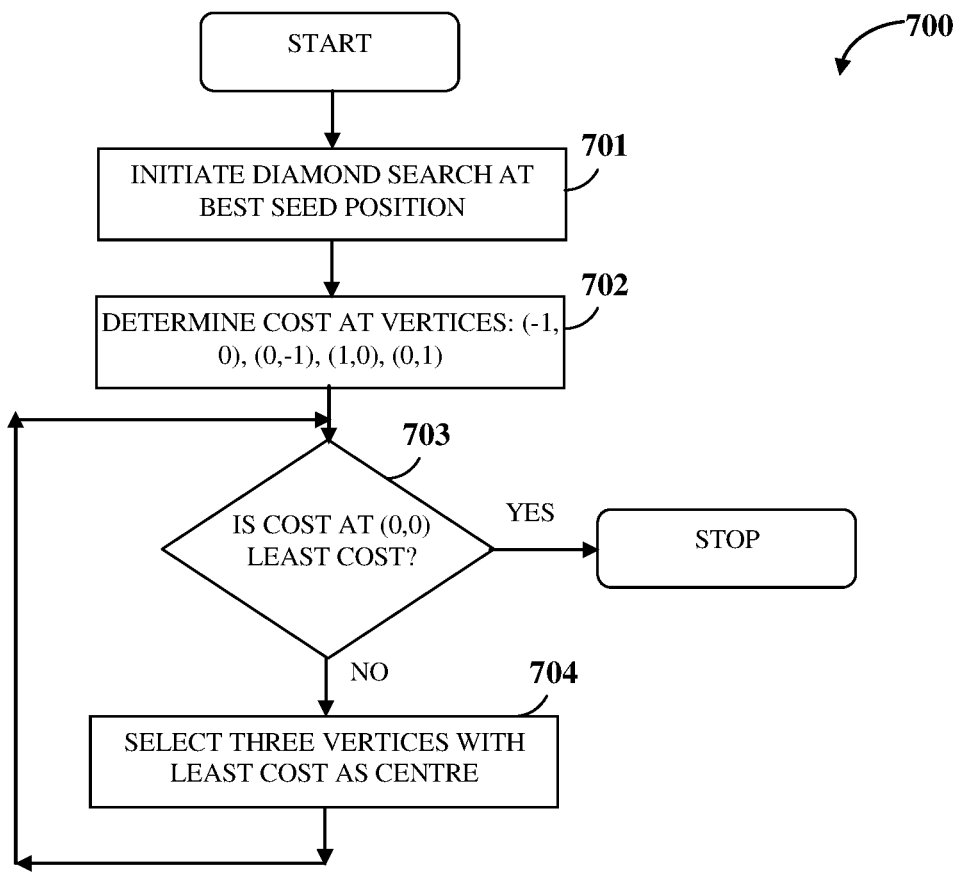
FIG. 7 exemplarily illustrates a method for performing a diamond search.

FIG. 7 exemplarily illustrates a flow diagram 700 showing a method for performing a diamond search. As said at block 701, the codec initiates the diamond search at the start point (0, 0) determined from the hexagonal search. As said at block 702, the codec determines cost at each of the four vertices, that is, at points (−1, 0), (0,−1), (1,0), and (0,1) of the diamond drawn around the start point (0,0) as centre and radius=1. The codec then checks as depicted at block 703, whether the cost at the start point (0, 0) is the least cost among all the five costs or if the reference exceeds the search area. If the cost at the start point (0, 0) is the least cost among all the five costs or if the reference exceeds the search area, the codec exits the diamond search.

If the cost at the start point (0, 0) is not the least cost among all the five costs, then the codec selects as said at block 704, the vertex with the least cost as centre for performing the diamond search. If the least cost is at point (−1,0), the codec selects (−1,0) as centre and again performs a diamond search at vertices (0,1), (−1,0) and (0,−1) around (−1, 0). If the least cost is at (0,−1), the codec selects (0,−1) as centre and performs the diamond search at increments of (−1, 0), (0,−1) and (1,0) around (0,−1). If the least cost is at point (1,0), the codec selects (1, 0) as centre and performs the diamond search at increments of (0,−1), (1,0) and (0,1) around the point (1, 0). If the least cost is at point (0,1), the codec selects (0, 1) as the centre and performs the diamond search at increments of (1,0), (0,1) and (−1,0) around (0,1).

The codec repeats blocks 703 to 704, until the seed position with least cost is found. This process is repeated not more than 20 times.

It should be noted that the system of the present invention comprises a codec performs the methods illustrated in FIGS. 1-7. The codec determines the best mode by evaluating each coding mode and its associated cost one by one until the mode with least cost is obtained. Thus, the codec does not evaluate all the prediction modes to find a best match and decide on the best prediction mode by evaluating one or more modes. Evaluating only one or more prediction modes instead of evaluating all the prediction modes for determining the best prediction mode decreases the computational complexity.

This written description uses examples to describe the subject matter herein, including the best prediction mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for selecting a coding mode from one or more coding modes for transcoding a 16*16 macro-block in a current frame, the method comprising:
    calculating a cost associated with a first coding mode, wherein the first coding mode comprises transcoding the 16*16 macro-block;
    selecting a skip-mode for transcoding the macro-block if a cost associated with the skip mode is less than a pre-determined percentage of the cost associated with the first coding mode;
    selecting the first coding mode for transcoding the macro-block if a cost associated with a second coding mode is greater than the cost associated with the first coding mode, wherein the second coding mode comprises transcoding four 8*8 blocks constituting the macro-block, and the cost associated with the second mode being greater being determined by a cost associated with one 8*8 block or a cumulative cost associated with two or more 8*8 blocks being greater than one or more predetermined percentages of the cost associated with the first coding mode;
    otherwise, selecting the second coding mode for transcoding the macro-block if a cost associated with transcoding one or more 16*8 blocks constituting the macro-block and a cost associated with transcoding one or more 8*16 blocks constituting the macro-block are greater than one or more pre-determined percentages of the cost associated with the second coding mode or one or more pre-determined percentages of the cost associated with the first coding mode; and
    otherwise, selecting one of a third coding mode and a fourth coding mode, the coding mode with a lower cost between the cost associated with transcoding one or more 16*8 blocks constituting the macro-block and the cost associated with transcoding one or more 8*16 blocks constituting the macro-block, wherein the third coding mode comprises transcoding two 16*8 blocks and the fourth coding mode comprises transcoding two 8*16 blocks.

2. The method as claimed in claim 1, wherein calculating the cost associated with transcoding each of the one or more coding modes comprises:
   determining a motion vector for each block-size in a reference frame by using one of an integer level motion vector estimation, half pel motion vector estimation or qual pel motion vector estimation, for each of the one or more coding modes.

3. The method of claim 2 wherein the integer level motion vector estimation is performed by:
   determining a starting seed position for performing a hexagonal search;
   performing a hexagonal search starting from the determined seed position; and
   performing a diamond search.

4. The method of claim 3 further comprising:
   determining a position of the integer level motion vector; and
   calculating a cost associated with the integer level motion vector.

5. The method of claim 2 further comprising:
   determining a position of the half pel motion vector from in and around the integer level motion vector; and
   calculating a cost associated with the half pel motion vector.

6. The method of claim 2 further comprising:
   determining position of the qual pel motion vector from around the position of the half pel motion vector; and
   calculating a cost associated with the qual pel motion vector.

7. The method of claim 1, wherein the coding mode for the macroblock is selected based on the least cost selected from any one of:
   cost associated with the integer level motion vector;
   cost associated with the half integer level motion vector; and
   cost associated with the qual pel level motion vector.

8. The method of claim 1, wherein selecting the skip mode comprises:
   evaluating the skip mode for the 16*16 macro-block;
   comparing the cost associated with transcoding the skip mode with the pre-determined percentage of the cost associated with transcoding the 16*16 macro-block; and
   selecting the skip mode for transcoding the 16*16 macro-block if the cost associated with transcoding the skip mode is less than the pre-determined percentage of the cost associated with transcoding the 16*16 macro-block.

9. The method of claim 8 wherein the skip mode is evaluated by:
   predicting a skip motion vector based on the motion vectors of neighborhood macroblocks;
   performing luma motion compensation with the skip motion vectors;
   determining a residue between an original block and motion compensated block;
   calculating a sum of absolute transformed differences of the residue;
   evaluating a cost associated with the skip motion vector; and
   declaring skip of the macroblock based on the cost associated with the skip motion vector.

10. The method of claim 9 further comprising:
    performing integer forward transform and quantization on the residue;
    determining a coefficient cost of luma residue;
    checking whether any of the coefficient costs of the 8×8 blocks is greater than a pre-defined luma 8×8 coefficient cost threshold; and
    declaring skip of the macroblock based on the when any of the coefficient costs of the 8×8 blocks is greater than a pre-defined luma 8×8 coefficient cost threshold.

11. The method of claim 10 wherein the coefficient cost of luma residue is the cost of the coefficients obtained after transformation and quantization of the residue.

12. The method of claim 10 further comprising:
    checking whether the sum of all 8×8 blocks coefficient costs is greater than a pre-defined luma 16×16 coefficient cost threshold; and
    declaring skip of the macroblock based on if the sum of all 8×8 blocks' coefficient costs is greater than a pre-defined luma 16×16 coefficient cost threshold.

13. The method of claim 12 further comprising:
    performing red and blue chroma motion compensation, finding residue and performing integer forward transform;
    calculating DC coefficients and determining quantized DC coefficients component; and
    declaring skip of the macroblock based on if quantized DC coefficients is greater than or equal to a predetermined value.

14. A method of claim 13 further comprising:
    determining a sum of absolute transformed differences (SATD) of the residue;
    determining a quantized AC component based on SATD;
    checking whether for the macroblock there are neighborhood skip macroblocks based on the quantized AC component; and
    declaring skip of the macroblock based on comparing the quantized DC coefficients, the cost of P16×16 mode and cost threshold.

15. The method of claim 10 wherein the coefficient cost of luma residue is determined by:
    arranging the coefficients a 4×4 block in a zigzag pattern;
    removing trailing zeros from rearranged coefficients;
    calculating a run of zeros for each nonzero coefficient;
    checking whether nonzero coefficient is not equal to a predetermined value;
    assigning highest cost when nonzero coefficient is equal to a predetermined value else assigning cost based on run of zeros;
    accumulating cost of each nonzero coefficient; and
    calculating total cost of 8×8 block.

16. A system comprising a codec for performing the method of claim 1.

* * * * *